United States Patent
Nishida

(10) Patent No.: US 8,258,765 B2
(45) Date of Patent: Sep. 4, 2012

(54) SWITCHING REGULATOR AND SEMICONDUCTOR APPARATUS INCLUDING THE SAME

(75) Inventor: Junji Nishida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 573 days.

(21) Appl. No.: 12/488,694

(22) Filed: Jun. 22, 2009

(65) Prior Publication Data

US 2009/0322298 A1 Dec. 31, 2009

(30) Foreign Application Priority Data

Jun. 26, 2008 (JP) ................................ 2008-167147

(51) Int. Cl.
G05F 1/573 (2006.01)
G05F 1/00 (2006.01)
(52) U.S. Cl. ......... 323/277; 323/280; 323/284; 323/287
(58) Field of Classification Search ................ 323/274, 323/275, 277, 280, 282–287
See application file for complete search history.

(56) References Cited

U.S. PATENT DOCUMENTS

| | | | |
|---|---|---|---|
| RE37,609 E * | 3/2002 | Bittner ........................... | 323/272 |
| 2004/0212356 A1* | 10/2004 | Dowlatabadi ................. | 323/282 |
| 2005/0057238 A1* | 3/2005 | Yoshida ......................... | 323/282 |
| 2005/0258808 A1* | 11/2005 | Chen et al. .................... | 323/222 |
| 2006/0273772 A1* | 12/2006 | Groom ........................... | 323/284 |
| 2007/0085520 A1* | 4/2007 | Ho ................................. | 323/282 |
| 2008/0030178 A1* | 2/2008 | Leonard et al. ............... | 323/282 |
| 2008/0061758 A1* | 3/2008 | Nishida ......................... | 323/284 |
| 2008/0174292 A1* | 7/2008 | Nishida ......................... | 323/284 |
| 2009/0079408 A1* | 3/2009 | Qiao et al. ..................... | 323/283 |

FOREIGN PATENT DOCUMENTS

| | | |
|---|---|---|
| JP | 3647811 | 2/2005 |
| JP | 2007-209103 | 8/2007 |
| JP | 2007-241411 | 9/2007 |
| JP | 2007-252137 | 9/2007 |
| JP | 2007-252197 | 9/2007 |
| JP | 2008-72786 | 3/2008 |
| JP | 2008-72833 | 3/2008 |
| JP | 2008-72835 | 3/2008 |
| JP | 2008-83734 | 4/2008 |
| JP | 2008-131746 | 6/2008 |
| JP | 2008-131747 | 6/2008 |
| JP | 2008-178263 | 7/2008 |
| JP | 2008-206366 | 9/2008 |
| JP | 2008-228514 | 9/2008 |
| JP | 2009-5442 | 1/2009 |

* cited by examiner

Primary Examiner — Adolf Berhane
Assistant Examiner — Gary Nash
(74) Attorney, Agent, or Firm — Cooper & Dunham LLP

(57) ABSTRACT

A switching regulator is disclosed that includes a switching element; an inductor; a rectifier element; an error amplifier circuit portion; a PWM pulse generating circuit portion; a current sensing circuit portion; an output voltage decrease detecting circuit portion; a current pulse generating circuit portion; a phase detecting circuit portion; a VFM pulse generating circuit portion; and a switching control circuit portion configured to generate a control signal based on a PWM signal or a VFM signal and to switch a control status of the switching element from a PWM control to a VFM control in accordance with a third signal output from the phase detecting circuit portion, and to switch the control status from the VFM control to the PWM control in accordance with a second signal output from the output voltage decrease detecting circuit portion.

10 Claims, 3 Drawing Sheets

SWITCHING REGULATOR AND SEMICONDUCTOR APPARATUS INCLUDING THE SAME

BACKGROUND OF THE INVENTION

1. Field of the Invention

The present invention generally relates to a switching regulator, and more particularly relates to a switching regulator which switches a control status between a PWM control and a VFM control in accordance with a load of the switching regulator.

2. Description of the Related Art

Recently, electrical power saving in electronic devices has been demanded in terms of environmental problems. A trend such as this is especially prominent in battery operated electronic devices. In general, in order to save electrical power, it is important to reduce power consumption of the electronic device and to reduce wasteful power consumption in a power supply circuit by improving efficiency thereof. A non-insulated switching regulator including an inductor is widely applied as a high efficiency power supply circuit which is used in small electronic devices.

There are two main types known for controlling a switching regulator. The first is PWM (pulse width modulation) control which varies the duty cycle of a pulse signal in order to keep an output voltage of the switching regulator constant. The second is VFM (variable frequency modulation) control which varies the frequency of a pulse signal in order to keep an output voltage of the switching regulator constant.

According to the PWM control, a switching transistor included in the switching regulator is turned on/off at a constant frequency, even when an electrical load is relatively low. This causes a decrease in efficiency when the electrical load is relatively low. On the other hand, according to the VFM control, the frequency at which the switching transistor is turned on/off varies in accordance with the electrical load. Although the VFM control causes a larger effect of noise or ripple on the electronic device than the PWM control, the VFM control provides higher efficiency than the PWM control when the electrical load is relatively low. Because of these reasons, according to a conventional controlling method, the electronic efficiency is improved by switching the control status between the PWM control and the VFM control in accordance with the electrical load when the electrical load is relatively low or relatively high.

A general method for detecting an electrical load is by sensing a current flowing through a sensing resistor inserted into a current pathway between an input terminal and an output terminal. However, according to a method such as this, an electrical power loss at the sensing resistor increases as the current flowing through the sensing resistor increases. Thus, the method is not suitable for a battery operated small electronic device. There also is a method for detecting an electrical load indirectly by sensing a voltage of an error amplifier without using a sensing resistor (see, for example, patent document 1).

[Patent Document 1] Japanese Patent No. 3647811

The error amplifier includes an integrating circuit which eliminates ripple superimposed on the output voltage. The integrating circuit generally constitutes a phase compensation circuit. An output signal of the integrating circuit is at the same as time an output signal of the error amplifier. An integrating circuit such as this is optimized for a frequency of a PWM control. In a state where the switching transistor is turned on/off by a VFM control and the frequency for switching the switching transistor becomes lower than the frequency of the PWM control, the output signal of the integrating circuit is effective for sensing the electrical load (i.e. a load current) just after the switching transistor is turned on, but becomes ineffective while the switching transistor is turned off because the output signal becomes equal to the ground voltage or a voltage of a power source. The same can be applied in a state where the pulse of the PWM control is thinned out and the frequency for switching the switching transistor becomes lower. It becomes difficult to keep an output voltage of the error amplifier constant against the load current, and thus the relationship between the output voltage of the error amplifier and the load current becomes nonconstant. Thus, it is difficult to set the load current accurately when switching the control status between the PWM control and the VFM control by using an error amplifier compared with switching the control status by using an sensing resistor.

SUMMARY OF THE INVENTION

It is a general object of the present invention to provide a switching regulator and a semiconductor apparatus including the same which can set a load current accurately when switching a control status between a PWM control and a VFM control without using a sensing resistor.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a switching regulator and a semiconductor apparatus including the same particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a switching regulator configured to switch a control status of a switching element between a PWM control and a VFM control, and to convert an input voltage input to an input terminal into a predetermined constant voltage and output the predetermined constant voltage from an output terminal as an output voltage, the switching regulator including: the switching element configured to be switched in accordance with a control signal; an inductor configured to be supplied with current from the switching element; a rectifier element configured to carry current supplied from the inductor when the switching element is turned off; an error amplifier circuit portion configured to compare a proportion voltage proportional to the output voltage and a first reference voltage, and to output a first signal indicating a comparison result of the proportion voltage and the first reference voltage and generate an error voltage by amplifying a voltage difference between the proportion voltage and the first reference voltage; a PWM pulse generating circuit portion configured to generate a PWM signal used for performing the PWM control by modulating the error voltage; a current sensing circuit portion configured to sense a high side current flowing through the switching element and a low side current flowing through the rectifier element, and to output a signal indicating a sensing result of the high side current and a signal indicating a sensing result of the low side current; an output voltage decrease detecting circuit portion configured to output a second signal when detecting that the output voltage becomes less than or equal to a predetermined voltage; a current pulse generating circuit portion configured to generate a current pulse signal having a pulse width from a time point when the switching element is turned on to a time point when the high side current reaches a predetermined current value; a phase detecting circuit portion configured to compare a phase of the PWM signal and a phase of the current pulse signal, and to output a third signal indicating a comparison result of the phase of the PWM signal and the phase of the current pulse signal; a VFM pulse generating circuit portion configured to generate a VFM signal used for the VFM control based on the signal indicating a sensing result of the high side current and the signal indicating a sensing result of the low side current output from the current sensing circuit portion; and a switching control circuit portion configured to generate the control signal based on the PWM signal or the VFM signal and to switch the control status of the switching element from the PWM control to the VFM control in accordance with the third signal output from the phase detecting circuit portion, and to switch the control status from the VFM control to the PWM control in accordance with the second signal output from the output voltage decrease detecting circuit portion.

Another embodiment of the present invention provides a switching regulator configured to switch a control status of a switching element between a PWM control and a VFM control, and to convert an input voltage input to an input terminal into a predetermined constant voltage and output the predetermined constant voltage from an output terminal as an output voltage, the switching regulator including: an output voltage decrease detecting circuit portion configured to output a signal when detecting that the output voltage becomes less than or equal to a predetermined voltage; and a switching control circuit portion configured to switch the control status from the VFM control to the PWM control in accordance with the signal output from the output voltage decrease detecting circuit portion.

Yet another embodiment of the present invention provides a switching regulator configured to switch a control status of a switching element between a PWM control and a VFM control, and to convert an input voltage input to an input terminal into a predetermined constant voltage and output the predetermined constant voltage from an output terminal as an output voltage, the switching regulator including: the switching element configured to be switched in accordance with a control signal; an inductor configured to be supplied with current from the switching element; a rectifier element configured to carry current supplied from the inductor when the switching element is turned off; an error amplifier circuit portion configured to compare a proportion voltage proportional to the output voltage and a first reference voltage, and to output a first signal indicating a comparison result of the proportion voltage and the first reference voltage and generate an error voltage by amplifying a voltage difference between the proportion voltage and the first reference voltage; a PWM pulse generating circuit portion configured to generate a PWM signal used for performing the PWM control by modulating the error voltage; a current sensing circuit portion configured to sense a high side current flowing through the switching element and a low side current flowing through the rectifier element, and to output a signal indicating a sensing result of the high side current and a signal indicating a sensing result of the low side current; a current pulse generating circuit portion configured to generate a current pulse signal having a pulse width from a time point when the switching element is turned on to a time point when the high side current reaches a predetermined current value; a phase detecting circuit portion configured to compare a phase of the PWM signal and a phase of the current pulse signal, and to output a third signal indicating a comparison result of the phase of the PWM signal and the phase of the current pulse signal; and a switching control circuit portion configured to generate the control signal based on the PWM signal or the VFM signal and to switch the control status of the switching element from the PWM control to the VFM control in accordance with the third signal output from the phase detecting circuit portion.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
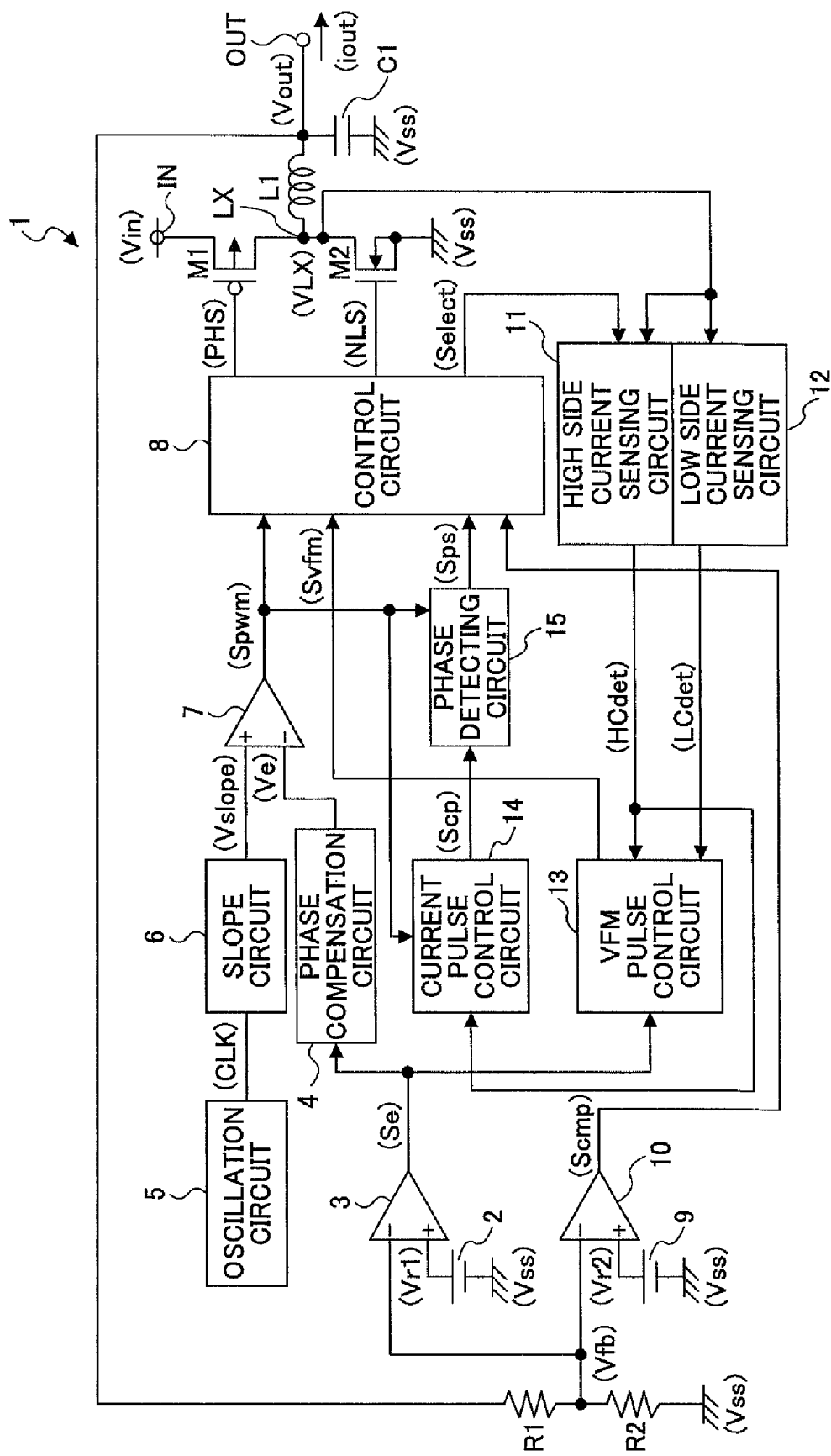
FIG. 1 is a schematic drawing showing a circuit of a switching regulator according to an embodiment.

FIG. 1 is a schematic drawing showing a circuit of a switching regulator according to an embodiment.

A switching regulator 1 shown in FIG. 1 is a synchronous rectifier type step down switching regulator which steps down an input voltage Vin input to an input terminal IN to a predetermined constant voltage and outputs it as an output voltage Vout at an output terminal OUT. A PWM control of the switching regulator 1 is performed by a voltage mode control.

The switching regulator 1 includes a switching transistor M1 formed of a PMOS transistor, a synchronous rectifier transistor M2 formed of an NMOS transistor, an inductor L1, an output capacitor C1, and resistors R1, R2. The switching transistor M1 and the synchronous rectifier transistor M2 perform switching in order to control the output voltage Vout based on the input voltage Vin. The resistors R1, R2 divide the output voltage Vout and generate a divided voltage Vfb so that the output voltage Vout can be sensed. The switching regulator 1 includes a first reference voltage generating circuit 2, a first comparator 3, a phase compensation circuit 4, an oscillation circuit 5, a slope circuit 6, and a PWM comparator 7. The first reference voltage generating circuit 2 generates a predetermined first reference voltage Vr1. The first comparator 3 compares the divided voltage Vfb and the first reference voltage Vr1 and outputs a signal Se indicating a comparison result. The phase compensation circuit 4 integrates the signal Se and outputs an error voltage Ve. The oscillation circuit 5 outputs a predetermined clock signal CLK. The slope circuit 6 generates a predetermined slope voltage Vslope based on the clock signal CLK. The PWM comparator 7 outputs a PWM signal Spwm having a pulse width proportional to the error voltage Ve. The PWM signal Spwm is used for performing the PWM control.

The switching regulator 1 further includes a control circuit 8, a second reference voltage generating circuit 9, a second comparator 10, a high side current sensing circuit 11, a low side current sensing circuit 12, a VFM pulse control circuit 13, a current pulse control circuit 14, and a phase detecting circuit 15. The control circuit 8 generates control signals PHS, NLS in order to perform switching of the switching transistor M1 and synchronous rectifier transistor M2. The second reference voltage generating circuit 9 generates a predetermined second reference voltage Vr2. The second comparator 10 detects a decrease of the output voltage Vout. The high side current sensing circuit 11 senses a high side current flowing through the switching transistor M1. The low side current sensing circuit 12 senses a low side current flowing through the synchronous rectifier transistor M2. The VFM pulse control circuit 13 generates a pulse signal Svfm. The pulse signal Svfm is used for performing the VFM control.

The switching transistor M1 constitutes a switching element, and the synchronous rectifier transistor M2 constitutes a rectifier element. The first reference voltage generating circuit 2, the first comparator 3, the phase compensation circuit 4, and the resistors R1, R2 constitute an error amplifier circuit portion. The oscillation circuit 5, the slope circuit 6, and the PWM comparator 7 constitute a PWM pulse generating circuit portion. The control circuit 8 constitutes a switching control circuit portion. The second reference voltage generating circuit 9, the second comparator 10, and the resistors R1, R2 constitute an output voltage decrease detecting circuit portion. The high side current sensing circuit 11 and the low side current sensing circuit 12 constitute a current sensing circuit portion. The VFM pulse control circuit 13 constitutes a VFM pulse generating circuit portion. The current pulse control circuit 14 constitutes a current pulse generating circuit portion. The phase detecting circuit 15 constitutes a phase detecting circuit portion. The circuit elements included in the switching regulator 1, except for the inductor L1 and the capacitor C1, may be integrated as an IC. Alternatively, the circuit elements included in the switching regulator 1, except for the switching transistor M1 and/or the synchronous rectifier transistor M2, the inductor L1, and the capacitor C1, may be integrated as an IC.

The switching transistor M1 and the synchronous rectifier transistor M2 are connected in series and inserted between the input terminal IN and the ground Vss. A connecting portion LX connects the switching transistor M1 and the synchronous rectifier transistor M2. The inductor L1 is inserted between the connecting portion LX and the output terminal OUT. The resistors R1 and R2 are connected in series to each other and are connected in parallel with the capacitor C1 between the output terminal OUT and the ground Vss. The divided voltage Vfb, i.e. a voltage of a connecting portion between the resistors R1 and R2, is input to an inverting input terminal of the first comparator 3. The first reference voltage Vr1 is input to a non-inverting input terminal of the first comparator 3. The first comparator 3 outputs the signal Se indicating a comparison result of the divided voltage Vfb and the first reference voltage Vr1. The signal Se is integrated, and the frequency of the integrated signal Se is regulated, in the phase compensation circuit 4. The phase compensation circuit 4 outputs the error voltage Ve, which is obtained by amplifying a voltage difference of the divided voltage Vfb and the first reference voltage Vr1, to an inverting input terminal of the PWM comparator 7.

The slope circuit 6 generates the slope voltage Vslope formed of a primary lamp output on each clock cycle, and outputs it to a non-inverting input terminal of the PWM comparator 7. The PWM comparator 7 compares the slope voltage Vslope and the error voltage Ve, and then generates the PWM signal Spwm having the pulse width proportional to the error voltage Ve, i.e. the PWM comparator 7 PWM-modulates the error voltage Ve to the PWM signal Spwm. The PWM comparator 7 outputs the PWM signal Spwm to each of the control circuit 8, the current pulse control circuit 14, and the phase detecting circuit 15. The control circuit 8 outputs the control signals PHS, NLS to the gate of the respective switching transistor M1 and the synchronous rectifier transistor M2.

The divided voltage Vfb is input to an inverting input terminal of the second comparator 10 and the second reference voltage Vr2 is input to a non-inverting input terminal of the second comparator 10. The second comparator 10 outputs a signal Scmp indicating a comparison result of the divided voltage Vfb and the second reference voltage Vr2 to the control circuit 8. A voltage VLX of the connecting portion LX and a selecting signal Select output from the control circuit 8 are input to the high side current sensing circuit 11. The high side current sensing circuit 11 senses the high side current based on the voltage VLX, and compares the high side current and a current value selected from a predetermined first current value i1 or a predetermined second current value i2 in accordance with the selecting signal Select. The high side current sensing circuit 11 outputs a signal HCdet indicating a comparison result of the high side current and the selected current value to the VFM pulse control circuit 13. The signal HCdet output from the high side current sensing circuit 11 reaches a high level when the high side current becomes greater than or equal to the first current value i1 or the second current value i2.

The voltage VLX is also input to the low side current sensing circuit 12. The low side current sensing circuit 12 senses the low side current based on the voltage VLX, and compares the low side current and a predetermined third current value i3. The low side current sensing circuit 12 outputs a signal LCdet indicating a comparison result of the low side current and the third current value i3 to the VFM pulse control circuit 13. The signal LCdet output from the low side current sensing circuit 12 reaches a high level when the low side current becomes less than or equal to the third current value i3.

The signals Se, HCdet, and LCdet are input to the VFM pulse control circuit 13. The VFM pulse control circuit 13 outputs the VFM signal Svfm to the control circuit 8.

The PWM signal Spwm and the signal HCdet are input to the current pulse control circuit 14. The current pulse control circuit 14 outputs a current pulse signal Scp to the phase detecting circuit 15. The phase detecting circuit 15 performs phase comparison of the PWM signal Spwm and the signal Scp, and outputs a signal Sps of a high level to the control circuit 8 when a phase of the PWM signal Spwm and a phase of the signal Scp match each other.

The control circuit 8 steps down the selecting signal Select to a low level when performing the PWM control, and outputs the PWM signal Spwm as the control signals PHS and NLS to the gate of the respective switching transistor M1 and the synchronous rectifier transistor M2. The control circuit 8 steps up the selecting signal Select to a high level when performing the VFM control, and outputs the VFM signal Svfm as the control signals PHS and NLS to the gate of the respective switching transistor M1 and the synchronous rectifier transistor M2. The signal Se constitutes a first signal, the signal Scmp constitutes a second signal, the signal Sps constitutes a third signal, the signal HCdet constitutes a fourth signal, and the signal LCdet constitutes a fifth signal.

Figure 2:
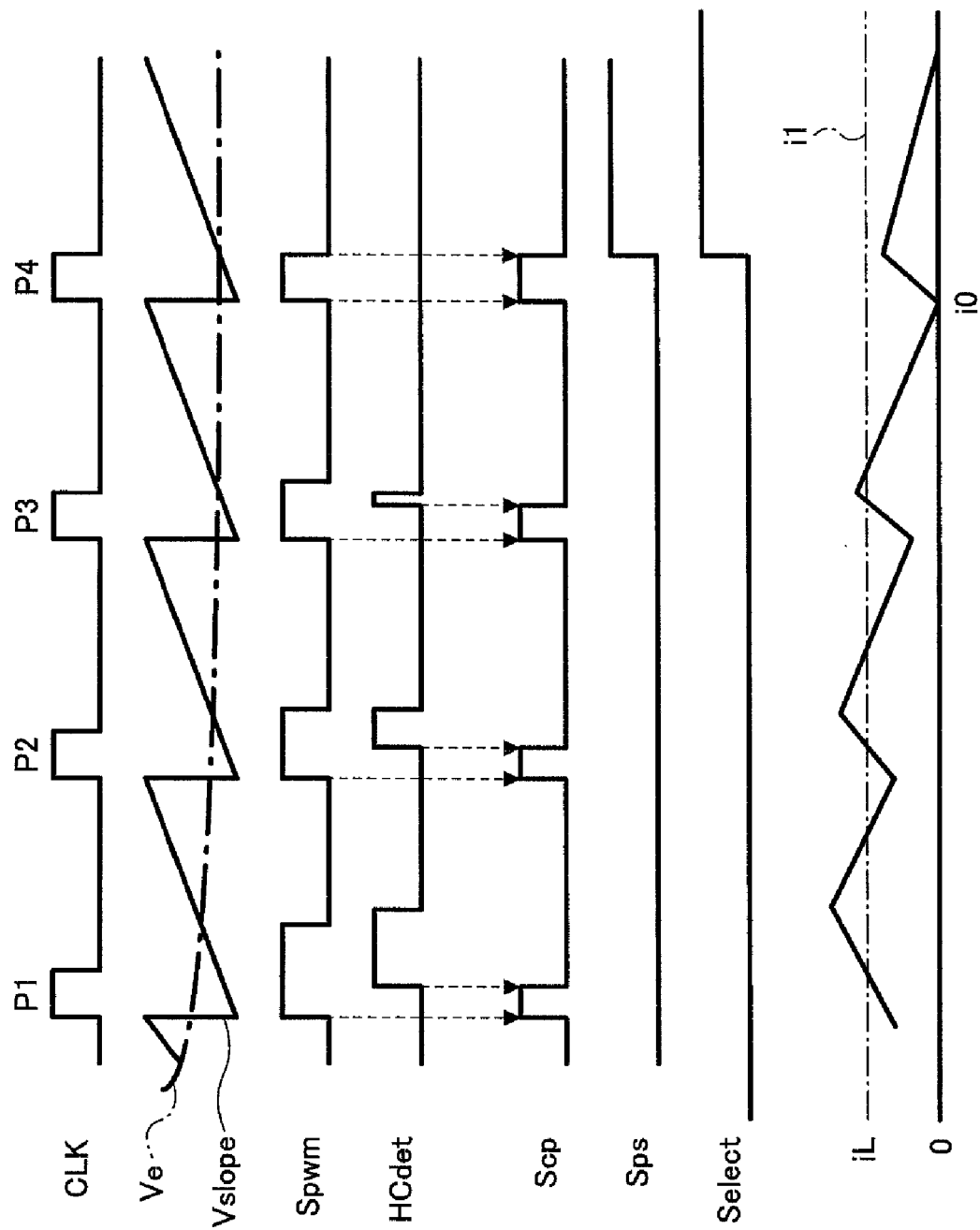
FIG. 2 is a timing chart showing an illustrated operation of a switching regulator 1 under a PWM control.

FIG. 2 is a timing chart showing an illustrated operation of the switching regulator 1 under the PWM control. In the following, an operation of the circuit shown in FIG. 1 under the PWM control will be described in detail with reference to FIG. 2. A symbol iL indicates an inductor current flowing through the inductor L1. The first current value i1 indicates a reference current value set in the high side current sensing circuit 11 under the PWM control.

The high side current sensing circuit 11 compares the high side current and the first current value i1 when the selecting signal Select which indicates selection of the PWM control is input from the control circuit 8. The high side current sensing circuit 11 steps up the signal HCdet to a high level when the high side current is greater than or equal to the first current value i1.

The current pulse control circuit 14 steps up the current pulse signal Scp to a high level when the PWM signal Spwm is stepped up to a high level, and steps down the current pulse signal Scp to a low level at the earlier of a time point when the PWM signal Spwm is stepped down to a low level and a time point when the signal HCdet is stepped up to a high level.

The phase detecting circuit 15 compares the phase of the current pulse signal Sap and the phase of the PWM signal Spwm, and outputs the signal Sps of a high level to the control circuit 8 when the phase of the PWM signal Spwm and the phase of the signal Scp match each other.

When performing the PWM control, the control circuit 8 steps down the selecting signal Select to a low level when the signal Samp is stepped down to a low level. When performing the VFM control, the control circuit 8 steps up the selecting signal Select to a high level when the signal Sps is stepped up to a high level.

Referring to FIG. 2, during time periods P1~P3 of the clock signal CLK, the current pulse control circuit 14 determines a high level pulse width of the current pulse signal Scp in accordance with a stepping up of the signal HCdet output from the high side current sensing circuit 11. During time period P4 of the clock signal CLK, the current pulse control circuit 14 determines a high level pulse width of the current pulse signal Scp in accordance with a stepping down of the PWM signal Spwm. Herein, a time point of a stepping up of the clock signal CLK is referred to as the beginning of a frame cycle, and a primary current value of the inductor current iL in the beginning of a frame cycle is referred to as i0. The first current value i1, which constitutes the reference current value of the PWM control, is used as a reference current value for sensing the high side current. An output current iout, which constitutes a load current, output from the output terminal OUT when an electrical load is connected to the output terminal OUT, is expressed in a formula (1) as shown below.

$$iout=i0+(i1-i0)/2 \quad (1)$$

Since the signal Sps of the phase detecting circuit 15 constitutes a control signal which switches a control status from the PWM control to the VFM control, the high side current value under the PWM control becomes less than the first current value i1 in a state where the signal Sps of a high level is output from the phase detecting circuit 15 when the phase of the PWM signal Spwm and the phase of the signal Scp match each other. Thus a current value of the output current iout during a cycle of the clock signal beginning from the stepping up of the clock signal P4 becomes less than or equal to the current value expressed in the right side of the formula (1). Particularly, the primary current value i0 becomes zero in a state where a peak current value of the high side current under the PWM control becomes less than or equal to the inductor current iL which is set by the first current value i1, and the PWM control is performed in a discontinuous mode. In this condition, the formula (1) is expressed in a formula (2), and the output current iout becomes less than or equal to i1/2.

$$iout=i1/2 \quad (2)$$

The output current iout, at which the control status is switched from the PWM control to the VFM control, becomes less than or equal to a half of the first current value i1 which is set in the high side current sensing circuit 11. The current value of the output current iout at which the control status is switched from the PWM control to the VFM control is set by setting the first current value i1.

Figure 3:
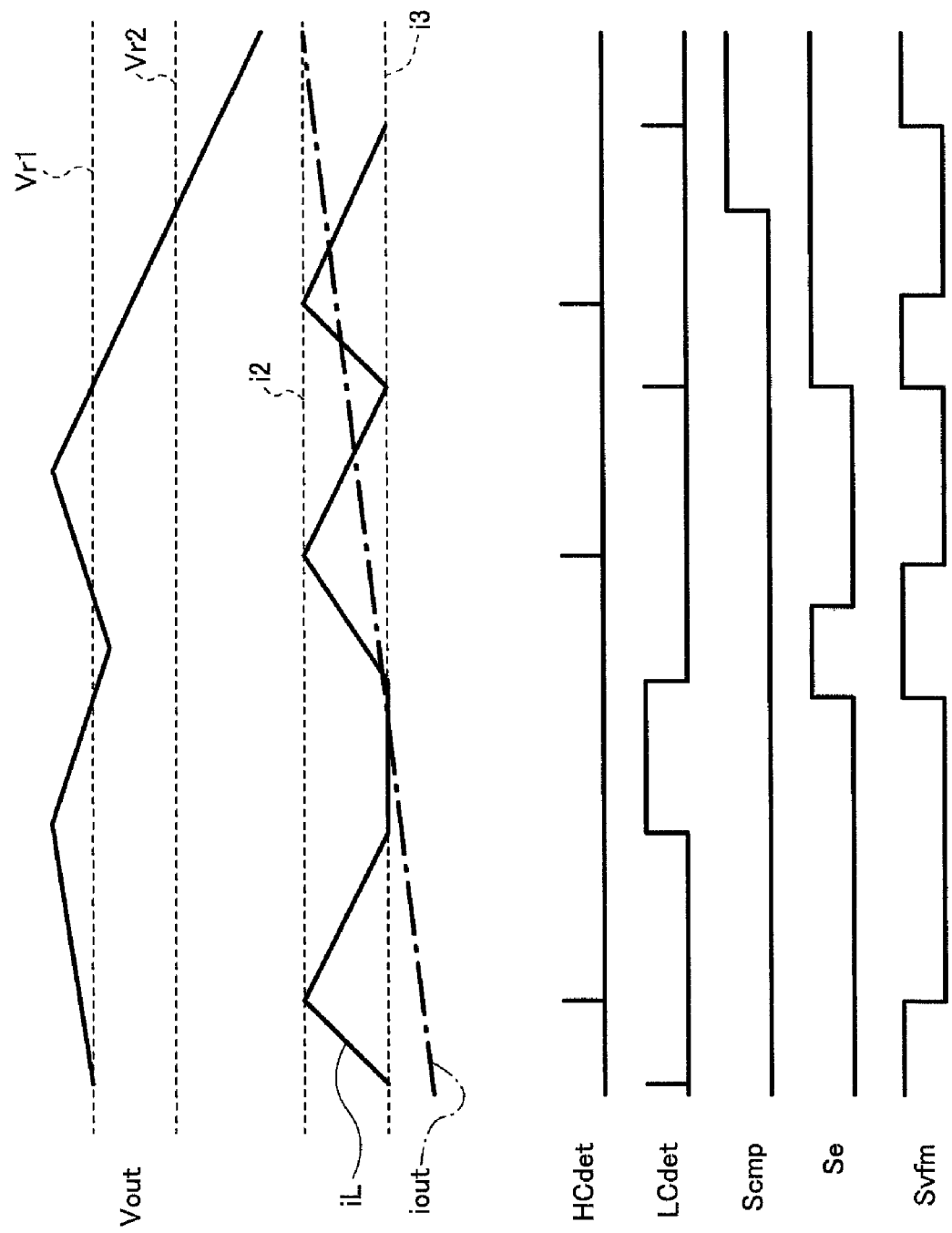
FIG. 3 is a timing chart showing an illustrated operation of the switching regulator 1 under a VFM control.

FIG. 3 is a timing chart showing an illustrated operation of the switching regulator 1 under the VFM control. In the following, an operation of the circuit shown in FIG. 1 under the VFM control will be described in detail with reference to FIG. 3.

The second current value i2 indicates a reference current value set in the high side current sensing circuit 11 under the VFM control. The third current value i3 indicates a reference current value set in the low side current sensing circuit 12 under the VFM control.

The high side current sensing circuit 11 compares the high side current and the second current i2 when the selecting signal Select which indicates selection of the VFM control is input from the control circuit 8. The high side current sensing circuit 11 steps up the signal HCdet to a high level when the high side current is greaer than or equal to the second current value i2.

The low side current sensing circuit 12 compares the low side current and the third current i3. The low side current sensing circuit 12 steps up the signal LCdet to a high level when the low side current is less than or equal to the third current value i3.

The VFM pulse control circuit 13 steps up the VFM signal Svfm to a high level in accordance with a stepping up of the signal LCdet indicating the comparison result of the low side current and the third current i3, and steps down the VFM signal Svfm to a low level in accordance with a stepping up of the signal HCdet indicating the comparison result of the low side current and the second current i2 selected by the selecting signal Select, when the signal Se of a high level is output from the first comparator 3. The VFM pulse control circuit 13 steps up the VFM signal Svfm to a high level in accordance with a stepping up of the output signal Se in a case where the signal LCdet is not stepped up to a high level when the output signal Se output from the first comparator 3 is stepped up to a high level.

The inductor current becomes equal to either the second current value i2 or the third current value i3 in a state where the VFM signal Svfm of a high level is output continuously under the VFM control. In such a situation, the current value of the output current iout becomes greater than or equal to an average value of the second current i2 and the third current i3 when the signal Scmp output from the second comparator 10 is stepped up to a high level. The output current iout at a time point when the second comparator detects a decrease of the output voltage Vout is expressed in a formula (3).

$$iout>(i2-i3)/2 \quad (3)$$

Thus, the output current iout at which the control status is switched from the VFM control to the PWM control, becomes greater than or equal to a half of the current value (i2−i3). The current value of the output current iout at which the control status is switched from the VFM control to the PWM control is set by setting the second current value i2 of the high side current sensing circuit 11 and the third current value i3 of the low side current sensing circuit 12.

According to the switching regulator of the present embodiment, the current value of the output current iout at which the control status is switched from the PWM control to the VFM control is set by setting the first current value i1. And at the same time, the current value of the output current iout at which the control status is switched from the VFM control to the PWM control is set by setting the second current value i2 of the high side current sensing circuit 11 and the third current value i3 of the low side current sensing circuit 12. Thus, it becomes possible to determine the load current accurately when switching the control status between the PWM control and the VFM control without using the sensing resistor.

In the above explanation, although the synchronous rectifier type step down switching regulator according to the embodiment of the present invention is used, this is merely one example. The present invention is applicable to all types of switching regulators such as a non-synchronous rectifier type step down switching regulator, a step up switching regulator, and an inverting type switching regulator.

Further, the switching regulator of the aforedescribed embodiment may be formed as a semiconductor apparatus with another circuit.

Further, the present invention is not limited to the aforedescribed embodiments, and variations and modifications may be made without departing from the scope of the present invention.

The present application is based on Japanese Priority Application No. 2008-167147 filed on Jun. 26, 2008 with the Japanese Patent Office, the entire contents of which are hereby incorporated by reference.

What is claimed is:

1. A switching regulator configured to switch a control status of a switching element between a PWM control and a VFM control, and to convert an input voltage input to an input terminal into a predetermined constant voltage and output the predetermined constant voltage from an output terminal as an output voltage, the switching regulator comprising:
the switching element configured to be switched in accordance with a control signal;
an inductor configured to be supplied with current from the switching element;
a rectifier element configured to carry current supplied from the inductor when the switching element is turned off;
an error amplifier circuit portion configured to compare a proportion voltage proportional to the output voltage and a first reference voltage, and to output a first signal indicating a comparison result of the proportion voltage and the first reference voltage and generate an error voltage by amplifying a voltage difference between the proportion voltage and the first reference voltage;
a PWM pulse generating circuit portion configured to generate a PWM signal used for performing the PWM control by modulating the error voltage;
a current sensing circuit portion configured to sense a high side current flowing through the switching element and a low side current flowing through the rectifier element, and to output a signal indicating a sensing result of the high side current and a signal indicating a sensing result of the low side current;
an output voltage decrease detecting circuit portion configured to output a second signal when detecting that the output voltage becomes less than or equal to a predetermined voltage;
a current pulse generating circuit portion configured to generate a current pulse signal having a pulse width from a time point when the switching element is turned on to a time point when the high side current reaches a predetermined current value;
a phase detecting circuit portion configured to compare a phase of the PWM signal and a phase of the current pulse signal, and to output a third signal indicating a comparison result of the phase of the PWM signal and the phase of the current pulse signal;
a VFM pulse generating circuit portion configured to generate a VFM signal used for the VFM control based on the signal indicating a sensing result of the high side current and the signal indicating a sensing result of the low side current output from the current sensing circuit portion; and
a switching control circuit portion configured to generate the control signal based on the PWM signal or the VFM signal and to switch the control status of the switching element from the PWM control to the VFM control in accordance with the third signal output from the phase detecting circuit portion, and to switch the control status from the VFM control to the PWM control in accordance with the second signal output from the output voltage decrease detecting circuit portion,
wherein the current sensing circuit portion outputs a fourth signal when detecting that the high side current becomes larger than or equal to a first current value, in a case where the switching control circuit portion performs the PWM control.

2. The switching regulator as claimed in claim 1, wherein the switching control circuit portion switches the control status from the PWM control to the VFM control when the signal indicating that the phase of the PWM signal and the phase of the current pulse signal match each other, and switches the control status from the VFM control to the PWM control when the second signal is input from output voltage decrease detecting circuit portion.

3. The switching regulator as claimed in claim 1, wherein the current pulse generating circuit portion generates the current pulse signal having a pulse width from a time point when the switching element is turned on by the switching control circuit portion and becomes in a conduction state at the earlier of a time point when the fourth signal is output from the current sensing circuit portion and a time point when the switching element is turned off and becomes in a cut-off status.

4. A semiconductor apparatus including the switching regulator as claimed in claim 1.

5. A switching regulator configured to switch a control status of a switching element between a PWM control and a VFM control, and to convert an input voltage input to an input terminal into a predetermined constant voltage and output the predetermined constant voltage from an output terminal as an output voltage, the switching regulator comprising:
the switching element configured to be switched in accordance with a control signal;
an inductor configured to be supplied with current from the switching element;
a rectifier element configured to carry current supplied from the inductor when the switching element is turned off;
an error amplifier circuit portion configured to compare a proportion voltage proportional to the output voltage and a first reference voltage, and to output a first signal indicating a comparison result of the proportion voltage and the first reference voltage and generate an error voltage by amplifying a voltage difference between the proportion voltage and the first reference voltage;
a PWM pulse generating circuit portion configured to generate a PWM signal used for performing the PWM control by modulating the error voltage;
a current sensing circuit portion configured to sense a high side current flowing through the switching element and a low side current flowing through the rectifier element, and to output a signal indicating a sensing result of the high side current and a signal indicating a sensing result of the low side current;

an output voltage decrease detecting circuit portion configured to output a second signal when detecting that the output voltage becomes less than or equal to a predetermined voltage;

a current pulse generating circuit portion configured to generate a current pulse signal having a pulse width from a time point when the switching element is turned on to a time point when the high side current reaches a predetermined current value;

phase detecting circuit portion configured to compare a phase of the PWM signal and a phase of the current pulse signal, and to output a third signal indicating a comparison result of the phase of the PWM signal and the phase of the current pulse signal;

a VFM pulse generating circuit portion configured to generate a VFM signal used for the VFM control based on the signal indicating a sensing result of the high side current and the signal indicating a sensing result of the low side current output from the current sensing circuit portion; and a switching control circuit portion configured to generate the control signal based on the PWM signal or the VFM signal and to switch the control status of the switching element from the PWM control to the VFM control in accordance with the third signal output from the phase detecting circuit portion, and to switch the control status from the VFM control to the PWM control in accordance with the second signal output from the output voltage decrease detecting circuit portion, wherein the current sensing circuit portion outputs a fourth signal when detecting that the high side current becomes larger than or equal to a second current value, and outputs a fifth signal when detecting that the low side current becomes smaller than or equal to a third current value in a case where the switching control circuit portion performs the VFM control, and wherein the third current value is smaller than the second current value.

6. The switching regulator as claimed in claim 5, wherein the VFM pulse generating circuit portion generates the VFM signal so that the switching element is turned on and becomes conduction state during a time period from a time point when the fifth signal is output from the current sensing circuit portion to a time point when the fourth signal is output from the current sensing circuit portion, when the first signal indicating the comparison result indicates that the proportion voltage is less than or equal to the first reference voltage is output from the error amplifier circuit portion.

7. The switching regulator as claimed in claim 6, wherein the VFM pulse generating circuit portion generates the VFM signal so that the switching element is turned on and becomes in a conduction state during a period from a time point when the first signal indicating the comparison result indicates that the proportion voltage becomes less than or equal to the first reference voltage is output from the error amplifier circuit portion to a time point when the fourth signal is output from the current sensing circuit portion, if the fifth signal is not output from the current sensing circuit portion, when the first signal indicating that the proportion voltage becomes less than or equal to the first reference voltage is output from the error amplifier circuit portion.

8. A semiconductor apparatus including the switching regulator as claimed in claim 5.

9. A switching regulator configured to switch a control status of a switching element between a PWM control and a VFM control, and to convert an input voltage input to an input terminal into a predetermined constant voltage and output the predetermined constant voltage from an output terminal as an output voltage, the switching regulator comprising:

the switching element configured to be switched in accordance with a control signal;

an inductor configured to be supplied with current from the switching element;

a rectifier element configured to carry current supplied from the inductor when the switching element is turned off;

an error amplifier circuit portion configured to compare a proportion voltage proportional to the output voltage and a first reference voltage, and to output a first signal indicating a comparison result of the proportion voltage and the first reference voltage and generate an error voltage by amplifying a voltage difference between the proportion voltage and the first reference voltage;

a PWM pulse generating circuit portion configured to generate a PWM signal used for performing the PWM control by modulating the error voltage;

a current sensing circuit portion configured to sense a high side current flowing through the switching element and a low side current flowing through the rectifier element, and to output a signal indicating a sensing result of the high side current and a signal indicating a sensing result of the low side current;

a current pulse generating circuit portion configured to generate a current pulse signal having a pulse width from a time point when the switching element is turned on to a time point when the high side current reaches a predetermined current value;

a phase detecting circuit portion configured to compare a phase of the PWM signal and a phase of the current pulse signal, and to output a third signal indicating a comparison result of the phase of the PWM signal and the phase of the current pulse signal; and a switching control circuit portion configured to generate the control signal based on the PWM signal or a VFM signal and to switch the control status of the switching element from the PWM control to the VFM control in accordance with the third signal output from the phase detecting circuit portion, wherein the current sensing circuit portion outputs a fourth signal when detecting that the high side current becomes larger than or equal to a first current value, in a case where the switching control circuit portion performs the PWM control.

10. A semiconductor apparatus including the switching regulator as claimed in claim 9.

* * * * *